US011138288B2

(12) United States Patent
Ruan et al.

(10) Patent No.: US 11,138,288 B2
(45) Date of Patent: Oct. 5, 2021

(54) PRIORITY-BASED RENDERING

(71) Applicant: International Business Machines Corporation, Armonk, NY (US)

(72) Inventors: Qi Ruan, Ningbo (CN); Yan Hu, Ningbo (CN); Yan Feng Han, Ningbo (CN); Wei Yan, Ningbo (CN); Jian Yu Wang, Ningbo (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/529,272

(22) Filed: Aug. 1, 2019

(65) Prior Publication Data
US 2021/0034692 A1    Feb. 4, 2021

(51) Int. Cl.
| | |
|---|---|
| *G06F 16/957* | (2019.01) |
| *G06F 16/958* | (2019.01) |
| *H04L 29/06* | (2006.01) |
| *H04L 29/08* | (2006.01) |

(52) U.S. Cl.
CPC ........ *G06F 16/9577* (2019.01); *G06F 16/986* (2019.01); *H04L 67/02* (2013.01); *H04L 67/2804* (2013.01); *H04L 67/42* (2013.01)

(58) Field of Classification Search
CPC ............................ G06F 16/9577; G06F 16/986
See application file for complete search history.

(56) References Cited

U.S. PATENT DOCUMENTS

| | | | |
|---|---|---|---|
| 9,582,480 B1 | 2/2017 | Chen | |
| 9,583,140 B1 * | 2/2017 | Rady | H04N 21/44016 |
| 9,678,928 B1 * | 6/2017 | Tung | G06F 40/14 |
| 9,965,451 B2 | 5/2018 | Zhou | |
| 2003/0069881 A1 * | 4/2003 | Huttunen | G06F 16/986 |
| 2008/0133404 A1 * | 6/2008 | Bascom | G06Q 20/10 |
| | | | 705/39 |
| 2010/0257230 A1 * | 10/2010 | Kroeger | H04L 67/02 |
| | | | 709/203 |
| 2011/0022974 A1 * | 1/2011 | Kinoshita | H04M 1/72583 |
| | | | 715/764 |
| 2011/0088039 A1 * | 4/2011 | Tabone | G06F 16/137 |
| | | | 718/104 |
| 2018/0067909 A1 | 3/2018 | Wei | |
| 2018/0217964 A1 * | 8/2018 | Lin | G06F 1/3203 |

OTHER PUBLICATIONS

Carlson, "Web Performance: How to Prioritize Visual Content", Rigor, Aug. 23, 2016, 23 pps., (https://rigor.com/blog/2016/08/how-to-prioritize-visual-content>.

* cited by examiner

*Primary Examiner* — Esther B. Henderson
(74) *Attorney, Agent, or Firm* — Edward J. Wixted, III

(57) ABSTRACT

Aspects of the present invention disclose a method, computer program product, and system for content rendering. The method includes one or more processors retrieving at least one user interface (UI) component from a Document Object Model (DOM) tree. The method further includes one or more processors determining a corresponding rendering priority level (RPL) for each of the at least one UI component. The method further includes, in response to determining that the corresponding RPL of a first UI component of the at least one UI component is above a first threshold, one or more processors rendering the first UI component.

19 Claims, 7 Drawing Sheets

FIRST ROUND RENDERING

SECOND ROUND RENDERING

PRIORITY-BASED RENDERING

BACKGROUND OF THE INVENTION

The present application relates to information processing, and more specifically, to priority-based rendering of content on a computing device.

Businesses nowadays generally utilize interconnected networks (e.g. Internet) to provide services via web applications embedded with business logics. A web application may be accessed by users via web browsers with which the web application may be rendered to provide corresponding services.

SUMMARY

Aspects of the present invention disclose a method, computer program product, and system for content rendering. The method includes one or more processors retrieving at least one user interface (UI) component from a Document Object Model (DOM) tree. The method further includes one or more processors determining a corresponding rendering priority level (RPL) for each of the at least one UI component. The method further includes, in response to determining that the corresponding RPL of a first UI component of the at least one UI component is above a first threshold, one or more processors rendering the first UI component.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
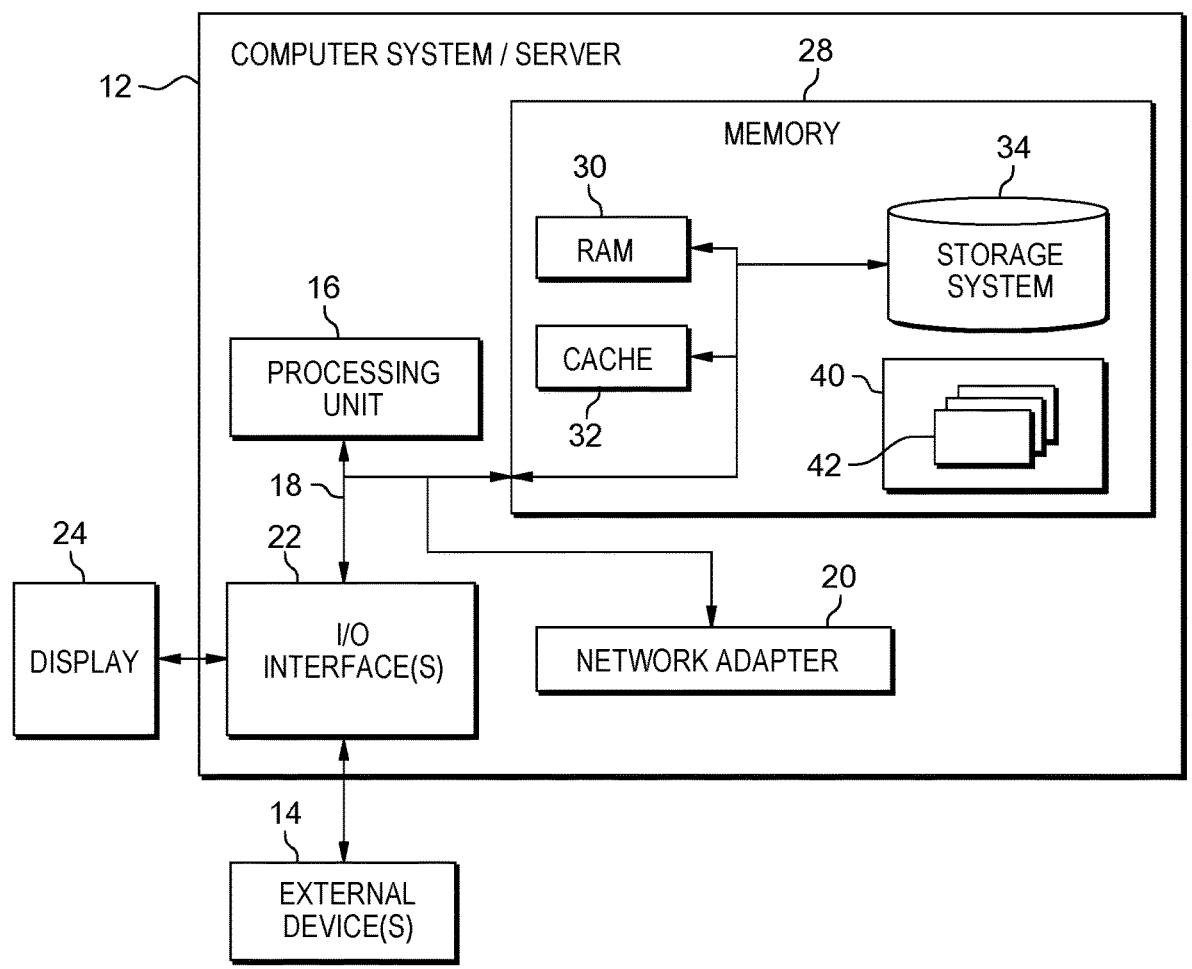
FIG. 1 depicts a cloud computing node, in accordance with embodiments of the present invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

As aforementioned, business nowadays rely heavily on web applications to provide services. Such web applications typically are embedded with business logics to provide corresponding services. Typically, a web application may be accessed and rendered via a web browser in response to users interacting with the web application. Accordingly, performance of a web application is critical, as often times user experiences will drop significantly if a web application is taking a very long time to load or is not responsive to user interactions.

Embodiments of the invention are targeting the problems stated out above and can be deployed on cloud computer systems which will be described in the following. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processing unit 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12;

and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
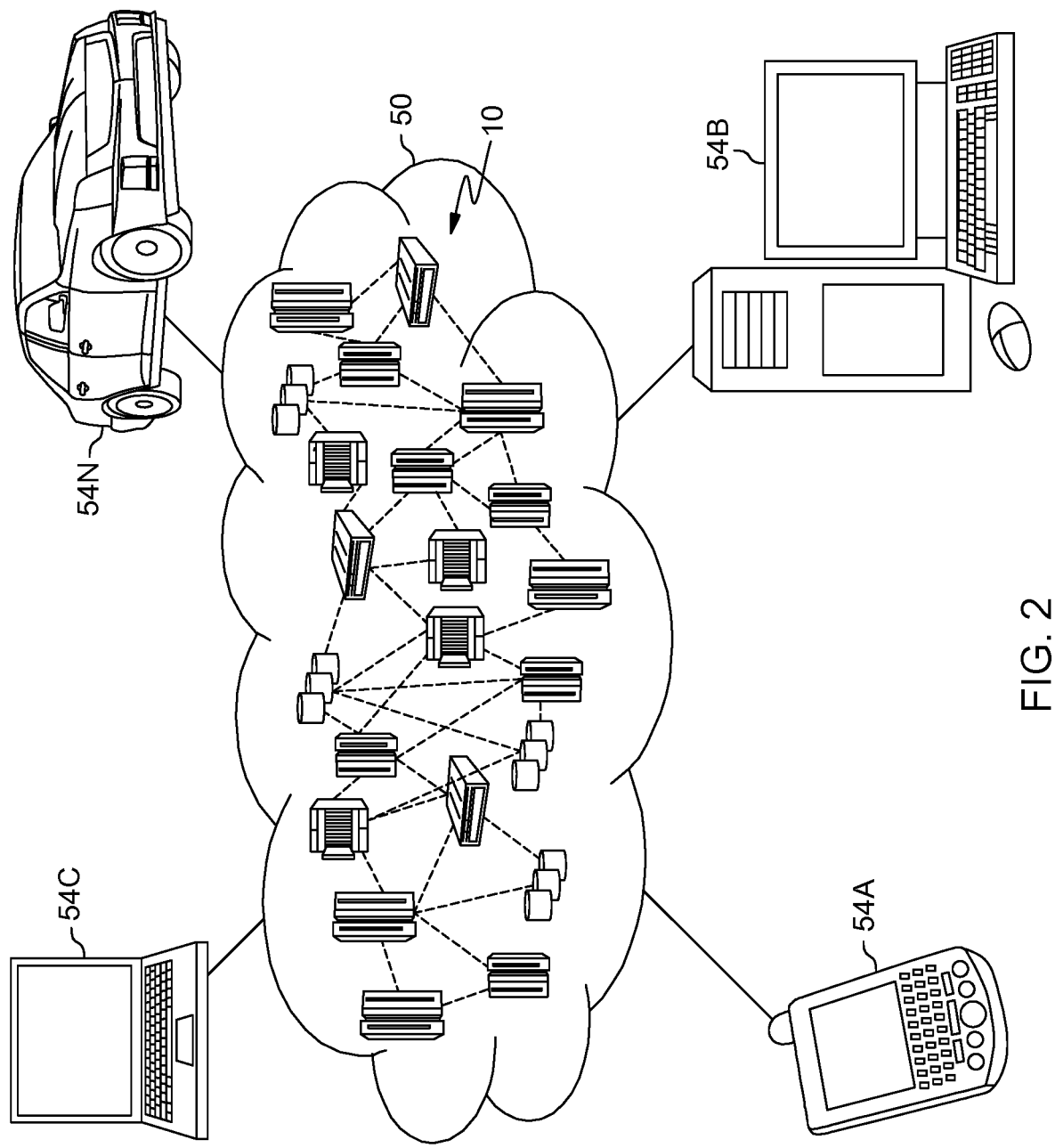
FIG. 2 depicts a cloud computing environment, in accordance with embodiments of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
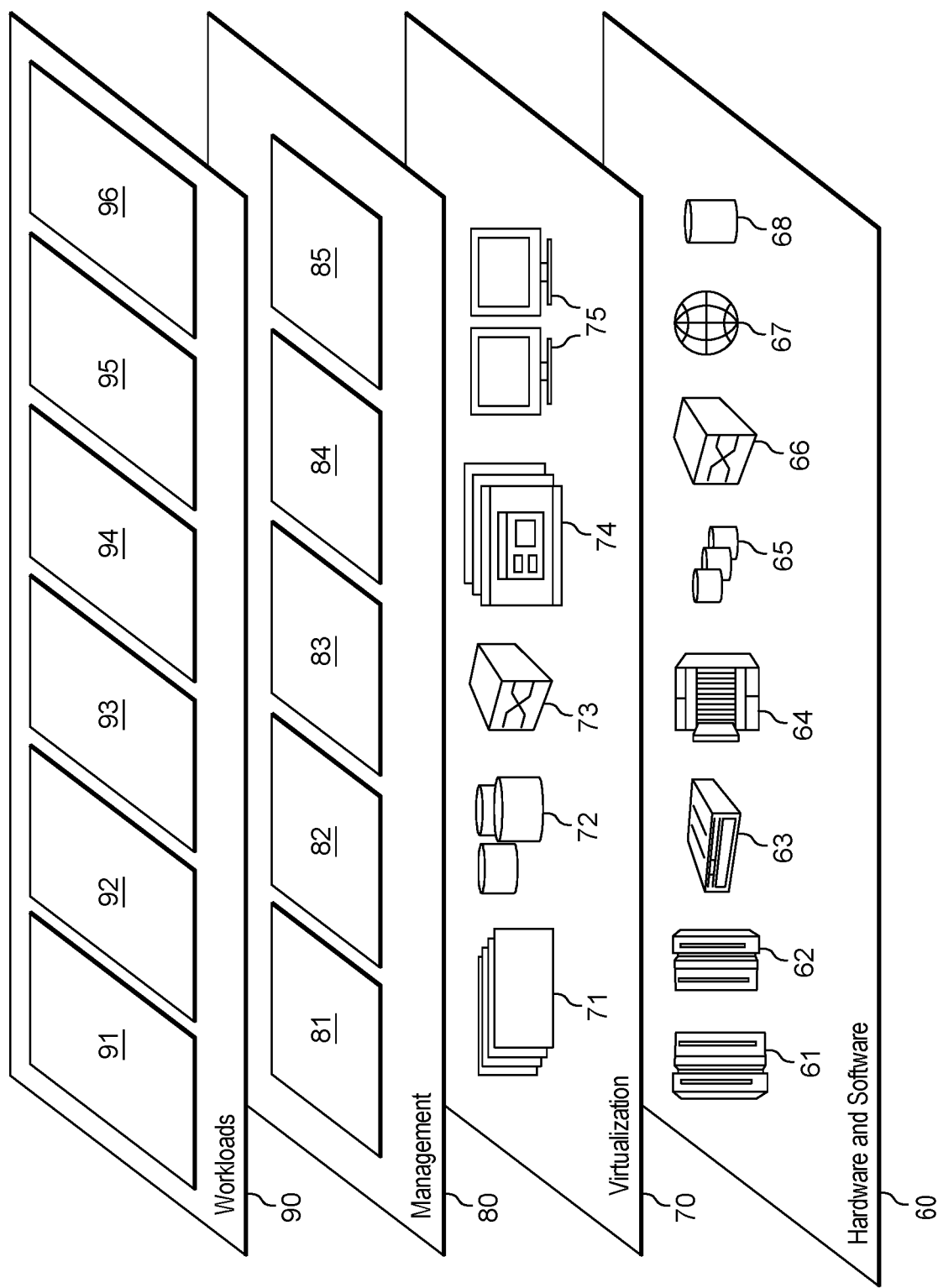
FIG. 3 depicts abstraction model layers, in accordance with embodiments of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and rendering control 96 according to embodiments of the invention.

Embodiments of the present invention recognize that performance bottlenecks in web applications largely lie in the rendering process, particularly when a large amount of executable code (e.g., scripting language code) are embedded in the web application. The execution of the code (e.g., scripting language code) calculations, especially instances that trigger extensive visual changes, can stall application performance. Long-running executable code (e.g., scripting language code) may also interfere with user interactions which further deteriorate the performance.

Embodiments of the present invention provide enhanced user experiences of web applications with a modified rendering process. According to embodiments of the present invention, user interface (UI) components of a web application are rendered based on respective priorities, so that users of the web application can receive information in a more efficient manner and in the meantime, the web application remains responsive to user interactions. Details of the embodiments will be described in detail in the following with references to FIG. 4 to FIG. 6.

Figure 4:
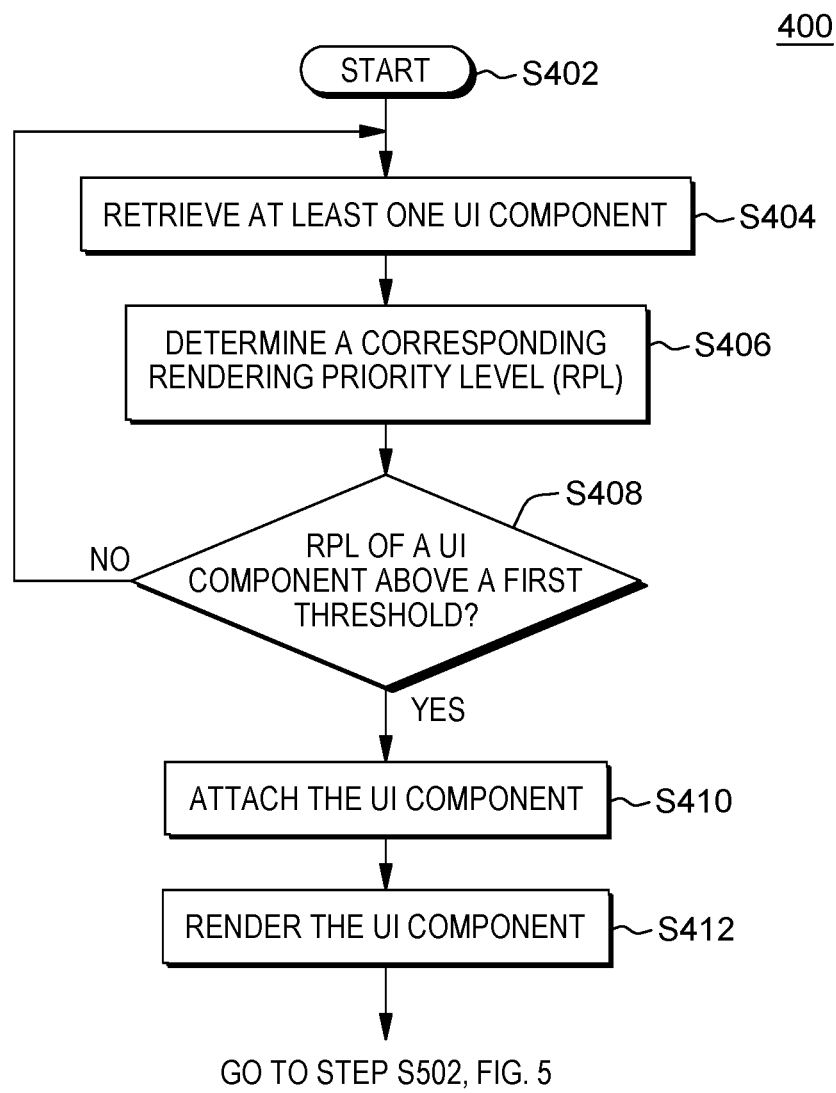
FIG. 4 depicts a flowchart of an exemplary method 400 for rendering, in accordance with embodiments of the present invention.

Referring now to FIG. 4, a flowchart of an exemplary method 400 for rendering according to an embodiment of the present invention is depicted. In various embodiments of the present invention, rendering priority engine 611 (utilizing rendering priority determination module 612 and attachment modifier 614, described in further detail with regard to FIG. 6) can perform one or more processes and/or steps of method 400.

Method 400 begins at step S402 and then flows to step S404, in which method 400 retrieves at least one user interface (UI) component from a Document Object Model (DOM) tree of a web application. In example embodiments, UI component includes at least one Document Object Model (DOM) node that together constitutes as a subtree of the DOM tree of the web application that a user is trying to access. A UI component, when rendered, may include one or more UI elements, one or more content bodies and/or other possible elements. The composition of a UI component (i.e., which DOM nodes are included in a UI component) may be pre-configured by the provider of the web application, or may be determined dynamically upon rendering, alternatively.

According to embodiments of the invention, a UI component may be pre-configured or determined upon rendering to comprise a set of DOM nodes that together contribute to a certain functionality of the web application. For example, a set of DOM nodes comprising DOM nodes that correspond to a text box for username input, a text box for password input, a button with caption 'Login' and a button with caption 'Cancel', together serving as the interface for user log in functionality, or a set of DOM nodes comprising DOM nodes that correspond to a drop down menu and a button with caption 'OK', together serving as the interface for users to select preferred language.

Then method 400 enters step S406, in which method 400 determines a corresponding rendering priority level (RPL) for each of the at least one UI component. In example embodiments, a rendering priority level of a UI component defines the rendering priority level of the UI component during the rendering process. Various embodiments of the present invention will render UI components with higher RPLs more preferentially than UI components with lower RPLs. According to an embodiment of the invention, the RPL of a UI component may be pre-configured by the provider of the UI component, which is also the provider of the web application. According to another embodiment of the invention, the provider of the UI component may be different from the provider of the web application.

According to a further embodiment of the invention, an RPL may be configured in the format of an integer, however, any other appropriate formats may be used. According to an embodiment of the invention, the smaller the value of the integer is, the higher the priority level is, or vice versa according to another embodiment of the invention. The RPL of a UI component may be provided by its provider via a database in a certain location, or together with the UI component as one of its properties. In one embodiment, method 400 can determine the RPL of a UI component by retrieving the respective RPL from the aforementioned database. In another embodiment, method 400 determines the RPL by reading the respective RPL from the properties of the UI component. An example of UI components and corresponding RPLs are given in Table 1, in which corresponding RPLs of UI components are in the format of integers.

TABLE 1

UI components with corresponding RPLs

| UI Component ID | RPL |
|---|---|
| 1 | 0 |
| 2 | 1 |
| 3 | 2 |
| ... | ... |

As shown in Table 1, the UI component with ID 1 is pre-configured with RPL 0, the UI component with ID 2 is pre-configured with RPL 1, and the UI component with ID 3 is pre-configured with RPL 2. Table 1 also includes the pre-configuration that the smaller the value of the RPL is, the higher the priority level is. That is to say, the priority level of RPL 0 is higher than the priority level of RPL 1 and RPL 2, and the priority level of RPL 1 is higher than the priority level of RPL 2. Accordingly, according to embodiments of the present invention, during rendering, UI component with ID 1 will be rendered more preferentially than UI components with ID 2 and ID 3, and UI component with ID 2 will be rendered more preferentially than UI component with ID 3.

As an example, the UI component which serves as the interface for user log in functionality may be pre-configured with RPL 0 so that it is with the highest priority level when rendering. The UI component which serves as the interface for users to select preferred language may be pre-configured with RPL 1. According to an embodiment of the invention, the corresponding RPL for each of the UI components may be adjusted by a behavior model of users of the UI components. The behavior model may be built based on the history of user interactions between users and the UI components. UI components with higher frequency of user interactions may be given higher RPLs and vice versa. The behavior model may be constructed and fine-tuned with a deep learning neural network (e.g. a convolutional neural network (CNN) or a recurrent neural network (RNN)). The construction and tuning of the behavior model may utilize any existing approaches and will not discussed in detail for the purpose of simplified illustration of the invention.

In step S408, method 400 determines whether the receptive RPL of a UI component is above a first threshold. In an example embodiment, responsive to determining that the corresponding RPL for each of the at least one UI component, method 400 (in step S408) performs a comparison between the determined RPL with a first threshold, in which the first threshold is a threshold used to control the rendering process. If the RPL of a UI component is above the first threshold (step S408, YES branch), then the UI component will be rendered (e.g., by being attached to the rendering tree and further rendered as usual in this round of rendering process, following traditional rendering process). If, however, the RPL of a UI component is not above the first threshold (step S408, NO branch), then the UI component will not be attached to the rendering tree (i.e., the UI component will be skipped in this round of the rendering process of the web application). In one embodiment, in response to determining that the RPL of a UI component is not above the first threshold (step S408, NO branch), method 400 proceeds to step S404. In another embodiment, in response to determining that the RPL of a UI component is not above the first threshold (step S5408, NO branch), method 400 ends.

According to an embodiment of the invention, the first threshold may be pre-configured by the provider of the web application. For example, the first threshold may be pre-configured as 1, which means only UI components with RPL above the first threshold (i.e., the UI component with ID 1 (with corresponding RPL as 0) in the above example) will be rendered in this round of rendering process. UI components with RPL not above the first threshold (e.g., the UI component with ID 2 (with corresponding RPL as 1) and the UI component with ID 3 (with corresponding RPL as 2) in the above example) will not be rendered in this round of rendering process.

Alternatively, according to an embodiment of the invention, the first threshold may also be determined dynamically during the rendering process of the web application. For example, the first threshold may be determined by evaluating the network bandwidth between the user and the server of the web application. If the bandwidth satisfies a certain condition, the first threshold may be determined as a corresponding value to the condition. For example, if the bandwidth is Gigabit Ethernet and the corresponding value to Gigabit Ethernet is 1, the first threshold may be determined as 1. The mapping between the bandwidth and corresponding value may be pre-configured and stored in a location so that it may be accessed and based on which the first threshold may be determined. Also, it should be pointed that the example of using bandwidth to determine the first threshold is also merely an example, any other suitable approach may be adopted to determine the first threshold.

As described above, if the determined RPL of a UI component is above the first threshold, the method 400 will flow to step S410, in which method 400 renders the UI component (e.g. by being attached to the rendering tree of the web application and further in step S412). If, however, if the determined RPL of a UI component is not above the first threshold (step S408, NO branch), then the rendering of the UI component is skipped hence the rendering of the UI component will not be carried out. In an example embodiment, the process of attaching the UI component to the rendering tree and rendering the UI component follows traditional rendering process and thus will not be discussed in detail for the purpose of simplified illustration of the invention.

In another embodiment, for each of the at least one UI component, method 400 conducts the comparison between the corresponding RPL and the first threshold until all of the at least one UI components are evaluated for inclusion in the current round of rendering process. In step S412, method 400 renders the UI component.

In the above, a modified rendering process is described in connection with embodiments of the invention in which, before the actual rendering of any UI component, a UI element is first evaluated for each of the at least one UI components whether the UI element is necessarily needed for the current round of rendering process by comparing the corresponding RPL of the UI element with a threshold that controls the rendering process. If a UI component is not necessarily needed for the current round of rendering process (i.e., the UI element has a respective RPL that falls below the threshold), then the UI element will be skipped in the current round of rendering process.

The aforementioned modified rendering process ensures that UI components with high RPLs (e.g., above the first threshold) will be firstly rendered, so that users of the web application may access the UI components deemed with high priority level without waiting for the completion of the rendering of all UI components comprised in the web application. Embodiments of the present invention recognize that a complete rendering of all UI components can take a long time and may be halted before users can actually interact with the web application. As the UI components deemed with high priority level are firstly rendered, the modified rendering process also keeps the web application responsive while waiting for the completion of the rendering of other remaining UI components.

Figure 5:
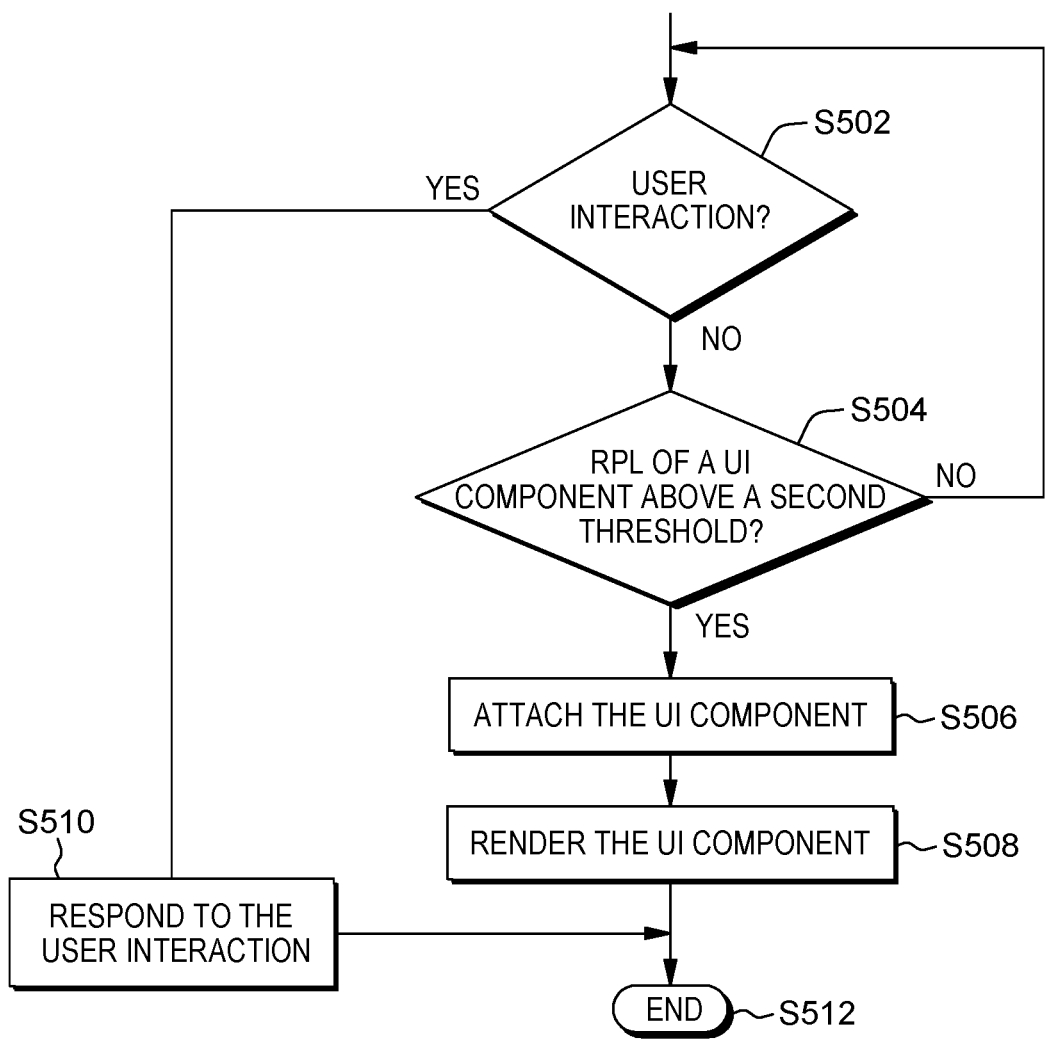
FIG. 5 depicts a flowchart of an exemplary method 500 for rendering, in accordance with embodiments of the present invention.

Now referring to FIG. 5, in which a flowchart of an exemplary method 500 for rendering according to an embodiment of the invention is depicted. In various embodiments of the present invention, rendering priority engine 611 (utilizing rendering priority determination module 612 and attachment modifier 614, described in further detail with regard to FIG. 6) can perform one or more processes and/or steps of method 500.

According to an embodiment of the invention, responsive to the completion of the rendering of the at least one UI component (e.g., in step S412 of FIG. 4) based on the determined RPLs and the first threshold (i.e., all UI components with corresponding RPLs above the first threshold have been rendered), method 500 flows to step S502. In step S502, method 500 determines whether at least one user interaction is detected. Responsive to a detection of at least one user interaction (step S502, YES branch), method 500 responds to the user interaction (step S510). In one embodiment, method 500 can detect the at least one user interaction by reading a user interaction queue, which records user interactions between a user and the web application, stored in a memory location (e.g., the user inputted username and password in corresponding text boxes and clicked the login button). In such embodiments, after the completion of the current round of rendering process, a login process will be processed to respond to the user interaction 'login' without waiting for the rendering of other remaining UI components. In another embodiment, subsequent to responding to the user interaction (in step S510), method 500 ends (step S512).

If, however, in step S502 method 500 does not detect a user interaction (step S502, NO branch), then method 500 flows to step S504. In step S504, method 500 performs a comparison between the determined RPL of a remaining UI component (after the last round of rendering process) and a second threshold is made. Similarly, the second threshold is also used to control the rendering process. If the RPL of a remaining UI component is above the second threshold (step S504, YES branch), then the UI component will be rendered (e.g., by being attached to the rendering tree and further rendered as usual in this round of rendering process, following traditional rendering process). If, however, the RPL of a remaining UI component is not above the second threshold (step S504, NO branch), then the UI component will not be attached to the rendering tree (i.e., the UI component will be skipped in this round of the rendering process of the web application). In one embodiment, in response to determining that the RPL of a remaining UI component is not above the second threshold (step S504, NO branch), method 500 proceeds to step S502. In another embodiment, in response to determining that the RPL of a remaining UI component is not above the second threshold (step S504, NO branch), method 500 ends.

In various embodiments of the present invention, the second threshold may also be pre-configured by the provider of the web application, or alternatively determined dynamically during the rendering process, similar to what has been discussed in the above (with regard to the first threshold). If the determined RPL of a remaining UI component is above the second threshold (step S504, YES branch), then method 500 attaches the remaining UI component to the rendering tree of the web application (step S506). Further, in step S508, method 500 renders the UI component. If, however, the determined RPL of a remaining UI component is not above the second threshold, then method 500 skips rendering the remaining UI component, hence the rendering of the UI component will not be carried out. In another embodiment, subsequent to rendering the UI component (in step S508), method 500 ends (step S512).

According to embodiment of the invention, the second threshold is below the first threshold (i.e., the corresponding priority level is lower). In example embodiments, for each of the remaining UI components, the comparison between a corresponding RPL of a UI component and the second threshold is conducted until all of the remaining components have been evaluated for inclusion in the second round of the rendering process. Further rounds of rendering process may be controlled by further thresholds, similar to the second round of rendering process and will be omitted for the purpose of simplified illustration.

According to an embodiment of the invention, if a low rendering environment is detected, the rendering of all UI components with RPLs below a low-rendering threshold can be skipped to accelerate the rendering process. For example, in a very low bandwidth environment with a low-rendering threshold configured as 1, all UI components with RPLs below 1 will not be attached to the rendering and will not be rendered. The attaching of the UI component to the rendering tree and the rendering of the UI component follows traditional rendering process and thus will not be discussed in detail for the purpose of simplified illustration of the invention.

Figure 6:
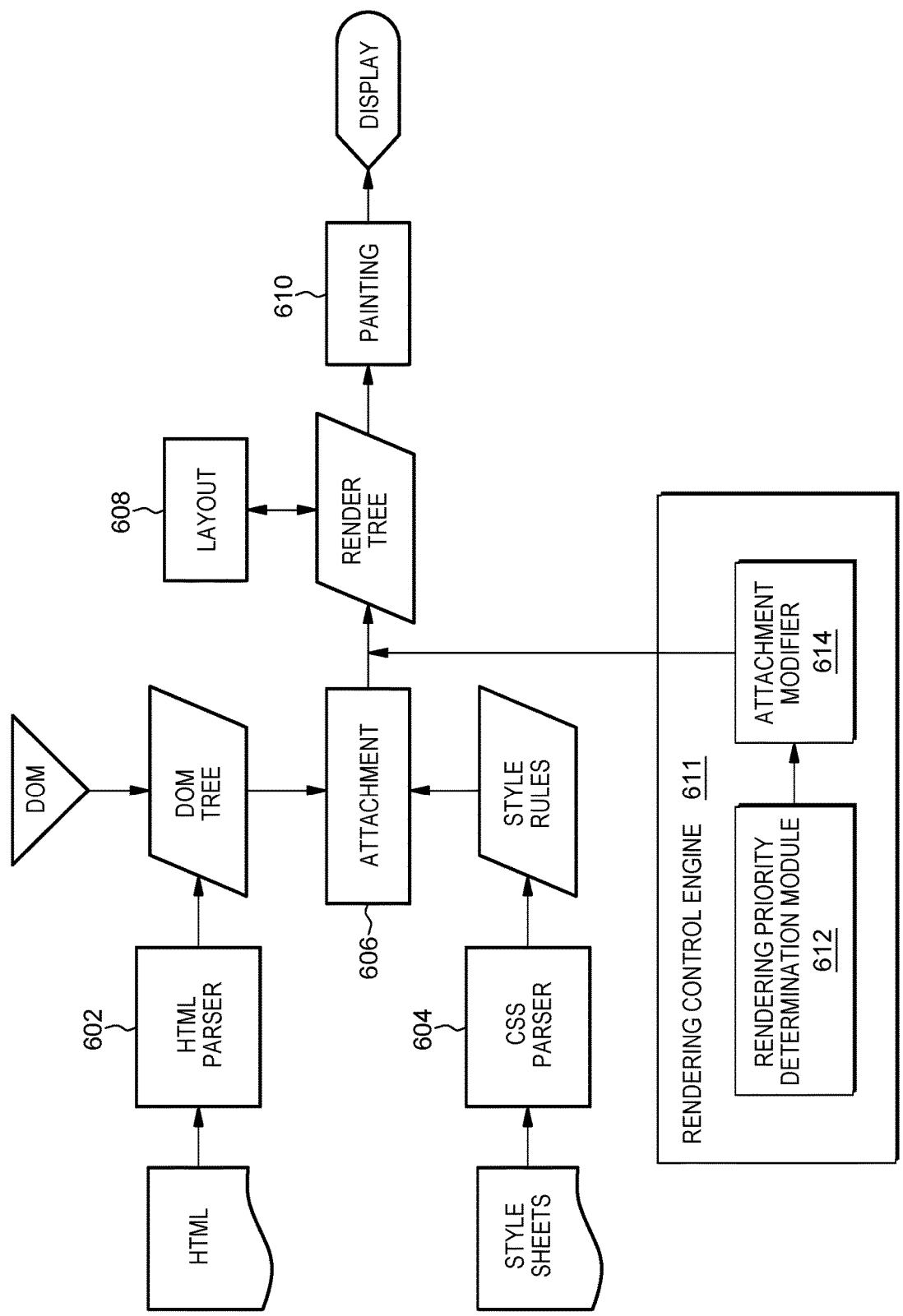
FIG. 6 depicts a block diagram of an exemplary system of rendering in connection with the exemplary methods of FIG. 4 and FIG. 5, in accordance with embodiments of the present invention.

Now referring to FIG. 6, which depicts a block diagram of an exemplary system of rendering in connection with the exemplary methods of FIG. 4 and FIG. 5, in accordance with embodiments of the present invention. The exemplary system of rendering comprises Hypertext Markup Language (HTML) parser 602, cascading style sheets (CSS) parser 604, attachment module 606, layout module 608, and painting module 610, which are similar to those in the existing systems of content rendering. The HTML parser 602 and the CSS parser 604 work same as existing systems in which the HTML parser 602 parses HTML code and generates a content tree, typically a DOM tree and the CSS parser 604 parses style sheets and generates style rules which specify the presentation of DOM nodes in the content tree.

Different from existing systems of content rendering, embodiments of the present invention introduce a rendering control engine 611 which includes a rendering priority determination module 612 and an attachment modifier 614. In various embodiments of the present invention, rendering control engine 611 accesses and utilizes a plurality of components of FIG. 6 (e.g., utilizing rendering priority determination module 612 and attachment modifier 614) to execute various processes of the present invention (e.g., processes and actions of method 44 and method 500).

Rendering priority determination module 612 determines a corresponding RPL for each of the at least one UI components included in the web application, as described above. Attachment modifier 614 modifies the rendering of the at least one UI component based on the determined RPL and at least one threshold, also as described in the above. In each round of the rendering process, the attachment modifier will attach a UI component to the rendering tree of the web application if a corresponding RPL is above a certain threshold or skip the rendering of the UI component if a corresponding RPL is not above the threshold. If a UI component is attached to the rendering tree of the web application, the following process follows traditional rendering process, in which the layout module 680 gives each DOM node in the rendering tree the exact coordinates where the DOM node should appear on the screen, based on the updated rendering tree. Then, the painting module 610 can traverse each DOM node and paint each respective instance on the screen.

Figure 7:
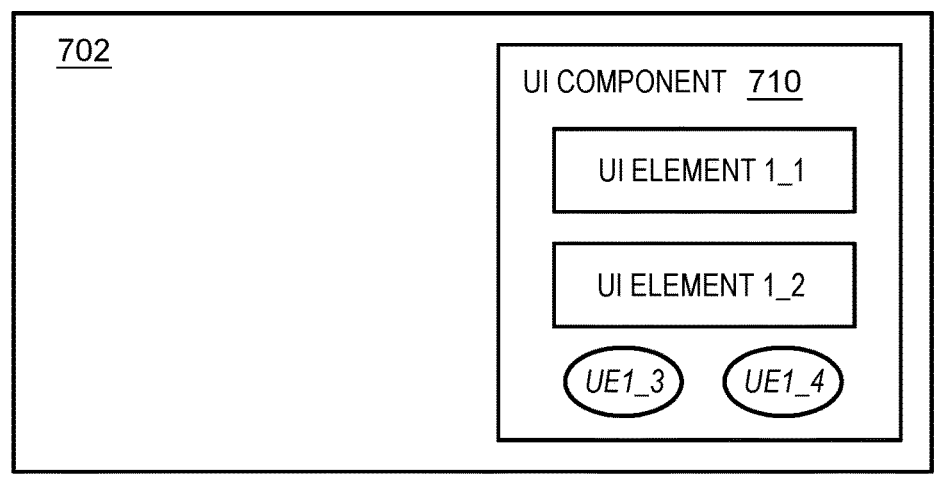
FIG. 7 depicts exemplary visual effects of rendering, in accordance with embodiments of the present invention.
Figure 7:
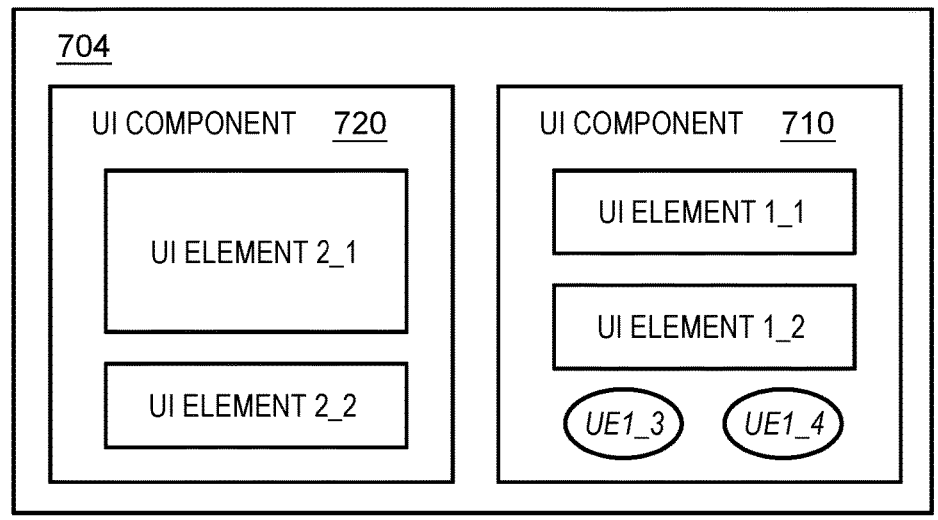

Referring again to FIG. 7, which depicts exemplary visual effects of rendering according to an embodiment of the present invention. In a first round of rendering, a corresponding RPL is determined for each of the at least one UI component of the web application. Then for each of the at least one UI component, a corresponding RPL is compared with a first threshold, e.g. 1. After the comparison, embodiments of the present invention determine that the RPL of UI component 710 (with corresponding RPL as 0) is above the first threshold. Then, UI component 710 is attached to the rendering tree of the web application and then rendered, as depicted in the "first round rendering) of FIG. 7. In addition, the "first round rendering) of FIG. 7 also depicts four UI elements within UI component 710. The RPLs of other UI components (e.g., UI component 720 (with corresponding RPL as 1) and additional UI components not depicted in FIG. 7 (with corresponding RPL as 2)) are not above the first threshold, therefore the rendering of other UI components is skipped.

In the second round of rendering, for each of the at least one remaining UI component, a corresponding RPL is compared with a second threshold, e.g. 2. After the comparison, embodiments of the present invention determine that the RPL of UI component 720 (with corresponding RPL as 1) is above the second threshold. Then, UI component 720 is attached to the rendering tree of the web application and then rendered, as depicted in the "second round rendering" of FIG. 7. In addition, the "second round rendering) of FIG. 7 also depicts two UI elements in UI component 720. The RPLs of other UI components (not shown (with corresponding RPL as 2)) are not above the second threshold, therefore the rendering of the other UI components is skipped.

It should be noted that the content rendering according to embodiments of this disclosure could be implemented by computer system/server 12 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for content rendering, the computer-implemented method comprising:
    retrieving, by one or more processors, at least one user interface (UI) component from a Document Object Model (DOM) tree;
    dynamically determining, by one or more processors, a first threshold by evaluating network bandwidth between a user and a server rendering a web application that includes the at least one UI component;
    determining, by one or more processors, a corresponding rendering priority level (RPL) for each of the at least one UI component;
    adjusting, by one or more processors, the corresponding RPL for each of the at least one UI component based on historical user interaction data between a plurality of users and respective instances of the at least one UI component; and
    responsive to determining that the corresponding RPL of a first UI component of the at least one UI component is above the first threshold, rendering, by one or more processors, the first UI component.

2. The computer-implemented method of claim 1, wherein rendering the first UI component further comprises:
    attaching, by one or more processors, the first UI component to a rendering tree.

3. The computer-implemented method of claim 1, further comprising:
    responsive to detecting a user interaction, responding, by one or more processors, to the user interaction.

4. The computer-implemented method of claim 2, further comprising:
    responsive to a completion of rendering the at least one UI component based on the first threshold and responsive to determining that a user interaction queue is empty of pending input user interactions, rendering, by one or more processors, a second UI component of the at least one UI component to the rendering tree responsive to the corresponding RPL of the second UI component being above a second threshold.

5. The computer-implemented method of claim 4, wherein the second threshold is lower than the first threshold.

6. The computer-implemented method of claim 1, wherein the corresponding RPL for each of the at least one UI component is pre-configured by a service provider of the content.

7. The computer-implemented method of claim 1, further comprising:
  responsive to detecting that network bandwidth between the user and the server rendering a web application corresponds to a low rendering bandwidth environment, skipping, by one or more processors, rendering of UI components with corresponding RPLs below a low-rendering threshold.

8. A computer program product for content rendering, the computer program product comprising:
  one or more computer readable storage media and program instructions stored on the one or more computer readable storage media, the program instructions comprising:
    program instructions to retrieve at least one user interface (UI) component from a Document Object Model (DOM) tree;
    program instructions to dynamically determine a first threshold by evaluating network bandwidth between a user and a server rendering a web application that includes the at least one UI component;
    program instructions to determine a corresponding rendering priority level (RPL) for each of the at least one UI component;
    program instructions to adjust the corresponding RPL for each of the at least one UI component based on historical user interaction data between a plurality of users and respective instances of the at least one UI component; and
    responsive to determining that the corresponding RPL of a first UI component of the at least one UI component is above the first threshold, program instructions to render the first UI component.

9. The computer program product of claim 8, wherein the program instructions to render the first UI component further comprise program instructions to:
  attach the first UI component to a rendering tree.

10. The computer program product of claim 8, further comprising program instructions, stored on the one or more computer readable storage media, to:
  responsive to detecting a user interaction, respond to the user interaction.

11. The computer program product of claim 9, further comprising program instructions, stored on the one or more computer readable storage media, to:
  responsive to a completion of rendering the at least one UI component based on the first threshold and responsive to determining that a user interaction queue is empty of pending input user interactions, render a second UI component of the at least one UI component to the rendering tree responsive to the corresponding RPL of the second UI component being above a second threshold.

12. The computer program product of claim 8, further comprising program instructions, stored on the one or more computer readable storage media, to:
  responsive to detecting that network bandwidth between the user and the server rendering a web application corresponds to a low rendering bandwidth environment, skip rendering of UI components with corresponding RPLs below a low-rendering threshold.

13. A computer system for content rendering, the computer system comprising:
  one or more computer processors;
  one or more computer readable storage media; and
  program instructions stored on the computer readable storage media for execution by at least one of the one or more processors, the program instructions comprising:
    program instructions to retrieve at least one user interface (UI) component from a Document Object Model (DOM) tree;
    program instructions to dynamically determine a first threshold by evaluating network bandwidth between a user and a server rendering a web application that includes the at least one UI component;
    program instructions to determine a corresponding rendering priority level (RPL) for each of the at least one UI component;
    program instructions to adjust the corresponding RPL for each of the at least one UI component based on historical user interaction data between a plurality of users and respective instances of the at least one UI component; and
    responsive to determining that the corresponding RPL of a first UI component of the at least one UI component is above the first threshold, program instructions to render the first UI component.

14. The computer system of claim 13, wherein the program instructions to render the first UI component further comprise program instructions to:
  attach the first UI component to a rendering tree.

15. The computer system of claim 13, further comprising program instructions, stored on the computer readable storage media for execution by at least one of the one or more processors, to:
  responsive to detecting a user interaction, respond to the user interaction.

16. The computer system of claim 14, further comprising program instructions, stored on the computer readable storage media for execution by at least one of the one or more processors, to:
  responsive to a completion of rendering the at least one UI component based on the first threshold and responsive to determining that a user interaction queue is empty of pending input user interactions, render a second UI component of the at least one UI component to the rendering tree responsive to the corresponding RPL of the second UI component being above a second threshold.

17. The computer system of claim 13, wherein the corresponding RPL for each of the at least one UI component is pre-configured by a service provider of the content.

18. The computer system of claim 13, wherein the corresponding RPL for each of the at least one UI component is adjusted by a behavior model of a user of the at least one component.

19. The computer system of claim 13, further comprising program instructions, stored on the computer readable storage media for execution by at least one of the one or more processors, to:
  responsive to detecting that network bandwidth between the user and the server rendering a web application corresponds to a low rendering bandwidth environment, skip rendering of UI components with corresponding RPLs below a low-rendering threshold.

\* \* \* \* \*